United States Patent
Macken et al.

(10) Patent No.: US 8,737,005 B1
(45) Date of Patent: May 27, 2014

(54) ADJUSTING HEATER CURRENT TO REDUCE READ TRANSDUCER ASYMMETRY

(75) Inventors: Declan Macken, Prior Lake, MA (US); Scott W. Stokes, Maple Grove, MN (US); Jenny J. Wang, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 501 days.

(21) Appl. No.: 12/985,952

(22) Filed: Jan. 6, 2011

(51) Int. Cl.
- *G11B 5/03* (2006.01)
- *G11B 27/36* (2006.01)
- *G11B 21/02* (2006.01)

(52) U.S. Cl.
USPC .................................. 360/66; 360/31; 360/75

(58) Field of Classification Search
None
See application file for complete search history.

(56) References Cited

U.S. PATENT DOCUMENTS

| | | | |
|---|---|---|---|
| 5,991,113 A | 11/1999 | Meyer et al. | |
| 6,483,297 B2 | 11/2002 | Sobey | |
| 7,102,839 B2 * | 9/2006 | Berman et al. | 360/48 |
| 7,573,682 B2 | 8/2009 | Pust et al. | |
| 7,656,619 B1 * | 2/2010 | Yan et al. | 360/294.7 |
| 2004/0240096 A1 * | 12/2004 | Baril et al. | 360/66 |
| 2005/0162785 A1 | 7/2005 | Grantstrom et al. | |
| 2005/0207053 A1 * | 9/2005 | Barnett et al. | 360/68 |
| 2006/0052905 A1 * | 3/2006 | Pfingsten et al. | 700/286 |
| 2010/0002327 A1 | 1/2010 | Call et al. | |

OTHER PUBLICATIONS

Jang, "Magnetic and Thermal Effects of Flying Height Control Heater Voltage on Tunneling Magnetoresistive Heads", American Institute of Physics, Mar. 11, 2008, 3 pages.

* cited by examiner

*Primary Examiner* — Regina N Holder
(74) *Attorney, Agent, or Firm* — Hollingsworth Davis, LLC (57) ABSTRACT

An asymmetry is determined of a signal generated by a read transducer in proximity to a changing magnetic field of a magnetic media. In response to determining the asymmetry of the signal, a current flowing through a heater of the read transducer is adjusted to cause a change to a magnetic field generated by the current. The change to the magnetic field generated by the current reduces the asymmetry of the signal.

19 Claims, 6 Drawing Sheets

ADJUSTING HEATER CURRENT TO REDUCE READ TRANSDUCER ASYMMETRY

SUMMARY

Various embodiments described herein are generally directed to methods, systems, and apparatuses that facilitate adjusting heater current to reduce read transducer asymmetry. In one embodiment, a method involves adjusting current flowing through a heater of a read transducer to produce a magnetic field that reduces an asymmetry of a signal generated by the read transducer. Adjusting the current flow may involve changing a direction of the current flow. The asymmetry may be determined via a transfer curve test, and in such a case the transfer curve test may involve placing the read transducer in a variable magnetic field during manufacture of a device that comprises the read transducer.

Other variations may include determining the asymmetry of the signal based on an output of the read transducer during operation of a data storage apparatus that comprises the read transducer. In some configurations, the heater is used to adjust a distance between the read head and a magnetic media. In other configurations, the read transducer may produce the signal in response to being proximate to a changing magnetic field of a magnetic media and/or the heater may include a joule heater.

In another embodiment, an apparatus includes a read transducer that generates a signal in response to reading a magnetic media. The apparatus further includes a heater that is coupled to a power source. The power source adjusts a current flowing through the heater to produce a magnetic field that reduces an asymmetry of the signal of the read transducer. The power source may adjust the current flow by changing a direction of the current flow. The asymmetry may be determined via a transfer curve test. In another configuration, the apparatus may include controller configured to determine the asymmetry of the signal based on an output of the read transducer during operation of the apparatus and adjust the current flowing through the heater via the power source in response thereto. In some variations, the heater is used to adjust a distance between the head and a magnetic media, and the heater may include a joule heater.

In another embodiment, a system includes a read transducer that generates a signal in response to being in proximity to a magnetic media. The system also includes a heater and a controller coupled to the heater. The controller includes circuitry that adjusts a current flowing through the heater to alter a magnetic field that encompasses at least the read transducer. The altered magnetic field reduces an asymmetry of the signal generated by the read transducer.

In one variation, the controller may adjust the current flow by changing a direction of the current flow. In another variation, the heater may be a joule heater that is used to adjust a distance between the head and the magnetic media. In yet another variation, the controller further includes circuitry configured to determine the asymmetry of the signal based on an output of the read transducer during operation of the system and to adjust the current flowing through the heater in response thereto.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure relates to techniques for reducing asymmetry in magnetic read heads. As will be described in greater detail below, signals generated by a read head in proximity to changing magnetic fields of a media may exhibit asymmetric output. For example, a read head may exhibit different maximum amplitudes of signal output in response to being subjected to magnetic fields having the same strength but different directions. This asymmetry can make it more difficult to discern the underlying data that is encoded in the media. In some embodiments discussed below, magnetic fields generated by a nearby heater (e.g., a joule heater) can be adjusted to reduce this asymmetry by adjusting a current flowing through the heater.

The techniques described herein may be utilized in transducer heads of magnetic data storage devices such as hard drive apparatus. These concepts may be equally applicable to any other type of magnetic reading device that exhibits asymmetric output and that utilizes a heater or similar current consuming device. The concepts may be applicable to different types of transducer heads in such devices, such as separate read head transducers and/or combination read/write heads.

Figure 1A:
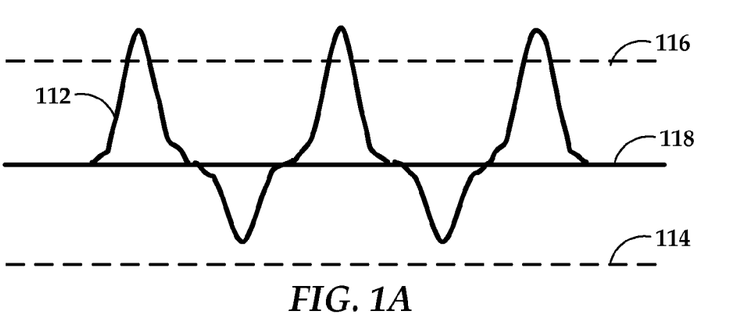
FIG. 1A is a graph illustrating signal asymmetries according to an example embodiment.

A magnetic read head generally operates by detecting a changing magnetic field, e.g., changes in direction of magnetic flux caused by relative motion between an encoded magnetic media and the read head. The read head converts the flux reversals into an electrical analog signal that represents data stored on the media. An example of such an analog signal 112 is shown in FIG. 1A. This analog signal 112 is converted to a digital signal, e.g., via an analog-to-digital converter (ADC) in order to reconstruct the data originally recorded onto the media.

Ideally, the analog signal 112 generated by the read head would be substantially symmetric about a reference voltage (e.g., zero volts) as indicated by amplitude reference lines 114, 116 that are symmetric about axis 118. In actual devices, however, manufacturing inconsistencies and read head wear may cause the read head to generate an asymmetric analog signal from the magnetic media. This can be seen in FIG. 1A by comparing peak amplitudes of signal 112 versus symmetric reference lines 114, 116. It will be appreciated that FIG. 1A illustrates one example of asymmetry due to differing peak amplitudes, and other types of asymmetry may be observed. For example, asymmetry may also include cases where the shape and/or area under the peaks of a signal above and below axis 118 are substantially different from each other.

If an asymmetric analog signal such as signal 112 is converted to a digital input signal, the resulting digital conversion may exhibit an increased number of data read errors over what would be expected from a symmetric signal. These data errors may make the read head unsuitable for use in a newly manufactured magnetic media storage device, and/or cause problems in such device while in use. If the analog signals become more asymmetric through time (e.g., due to wear or aging of the read head), the useful life of the data storage device may be shortened. In other cases, this asymmetry may impact performance, e.g., increase the use of error correction algorithms to correct errors, increase the probability of an uncorrectable read error, etc.

Asymmetry of the analog signal 112 may be detected in a number of ways. For example, during development and manufacturing, it is possible to test the response of the head to an applied magnetic field. One series of tests, known as "Transfer Curve Testing," involves placing a head in a magnetic field (steady state or time varying) and measuring the output signal from the read transducer. The transfer curve is a plot of the output signal versus the applied magnetic field, where the field is varied from a negative value to a positive value, the positive value having the same magnitude as the negative value. For a magneto-resistive type of head, the output signal may include a steady state voltage which is a function of the bias current applied to the head, the bulk resistance of the head and/or the applied magnetic field. A number of characteristics can be measured from the transfer curve data, including symmetry. Determination of symmetry may involve performing a comparison of the read signal amplitude with a maximum positive field and the read signal amplitude with a maximum negative field.

It may also be possible to determine asymmetry of a transducer head while operational in a hard drive or similar apparatus. For example, a circuit may accumulate a sum of positive and negative peak values of the analog read head signal. These accumulated valued can be averaged, and a level of asymmetry can be defined based on these average values. Regardless of the way read transducer asymmetries may be detected/determined, a storage device described herein may include features to reduce this symmetry at the read head before the asymmetric signal reaches an ADC and/or related circuits.

Figure 1B:
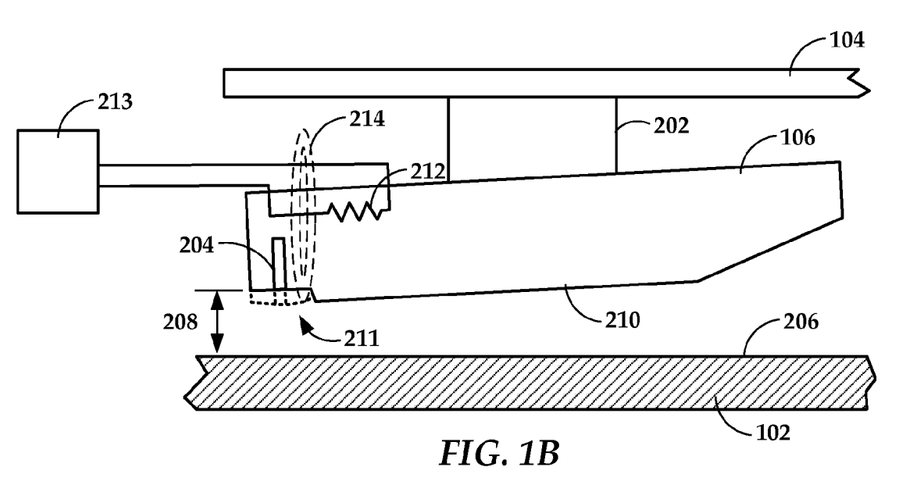
FIG. 1B is a side view of a disk drive slider according to an example embodiment.

In reference now to FIG. 1B, a block diagram shows a side view of a slider 106 that include features designed to reduce magnetic transducer asymmetries as discussed above. The slider 106 is coupled to arm 104 by way of a suspension 202 that allows some relative motion between the slider 106 and arm 104. The slider 106 includes a read transducer 204 at a trailing edge. When the slider 106 is located over surface 206 of disk 102, a flying height 208 is maintained between the slider 106 and surface 206 by a downward force of arm 104. This downward force is counterbalanced by an air cushion that exists between the surface 206 and an air bearing surface 210 of the slider 106 when the disk 102 is rotating.

It is desirable to maintain a substantially constant slider flying height 208 over a normal range of disk rotational speeds during both reading and writing operations to ensure consistent performance. This maintenance of flying height 208 is additionally challenging in view of the steady increase of magnetic disk data density, which is driven at least in part by the desire for ever-greater storage capacities. Higher data densities result in weaker magnetic fields that store data in the media. The flying height 208 of the slider 106 may need to be decreased in order to read these weaker fields, resulting in decreasing amounts of allowable manufacturing tolerances.

Improved slider and disk designs have enabled slider flying heights to be 4 millionths of an inch or less. Even so, variables such factors as data surface roughness, manufacturing tolerances, and unpredictable air bearing disturbances, all make it difficult to maintain a constant slider flying height. Also, the expansion and contraction of components due to changes in temperature have a more pronounced impact at lower slider flying heights.

To account for both static and dynamic variations that may affect slider flying height 208, the slider 106 may be configured such that a transducing region 211 of the slider 106 changes geometry in response to changes in temperature. This is shown in FIG. 1B by dotted line that represents a change in geometry of the transducing region 211 that may be induced in response to an increase or decrease in temperature. The shape and magnitudes of this changing geometry can be built into the slider, e.g., by forming the transducing region 211 from a different material than other parts of the slider 106. In such a case, changes in temperature causes a deformation in this area 211 due to different thermal expansion properties of the different materials. Thus, selective application of heat to the slider 106 can be used to finely adjust the effective fly height 208 of the read transducer 204, e.g., as measured between the read transducer 204 and media surface 206.

To provide this type of control over effective fly height 208, the slider 106 may include (or otherwise be thermally coupled to) a heating element 212. This heating element 212 (e.g., a resistance heater) may be provided with selectable amounts of current by a control circuit 213. The heating element 212 can be mounted at a variety of locations (e.g., near transducing region 211) and in a manner that minimizes its influence on the aerodynamic properties of the slider. The heat generated by heating element 212 is generally proportional to an amount of current flowing through heating element 212. The amount of current flowing through the heating element 212 may be dictated by feedback signals, such as temperature measurements of the slider 106 and/or characteristics of signals being read by the transducer 204.

The read transducer 204 generates electrical signals in response to moving through lines of magnetic flux. Modern hard drive read transducers commonly use materials with magnetoresistance (MR), giant magnetoresistance (GMR), tunneling magnetor resistance (TMR) properties to generate these signals. Generally, the resistance of an MR/GMR/TMR read head changes in accordance to characteristics of magnetic fields of the disk 104 while moving proximate to the read transducer 204. In addition to the read transducer 204, the slider 106 may also include a separate or merged but physically proximate write transducer (not shown). The write transducer utilizes properties of electromagnetism to magnetically encode data on the disk 104 in response to an electrical signal.

Among the aforementioned properties of electromagnetism used by write transducers is the generation of magnetic fields by an electrical current flowing through a conductor. These magnetic fields (sometimes referred to as "Ampere magnetic fields") are often visualized as a pattern of circular field lines surrounding the conductor through which current is flowing. The write transducer typically takes advantage of this property by sending current through a conductor surrounding a write pole, thereby generating a magnetic field at a tip of the write pole.

While a write transducer is designed to produce a particular shape and magnitude of magnetic field, any current carrying conductor may produce a magnetic field. For example, the heating element 212 utilizes current to produce heat, and so it follows that the heating element 212 and/or associated conductors that supply current to the heating element 212 will also generate magnetic fields. These fields are generally indicated in FIG. 2A by reference numeral 214.

The magnetic fields 214 produced via the heating element may be considered a form of interference that needs to be dealt with by the system designer, e.g., through the addition of shielding, routing of conductors, etc. However, when considered in light of the discussion above regarding read transducer asymmetry, the magnetic fields produced by the heater (and similar current drawing devices) may be put to good use in improving performance of the device. For example, if an external magnetic field can effectively shift the asymmetric signal 112 in FIG. 1A downward, the resulting signal may be significantly more symmetric, and therefore less like to produce errors and/or require other (possibly resource intensive) corrective measures.

Therefore, an apparatus may include features that utilize magnetic fields generated by a read heater 212 and similar current-consuming devices in order to provide asymmetry correction for read heads. Such asymmetry correction may occur by specific placement of conductors, selection of heater current direction, etc., during a design phase of the device. Methods, systems, and apparatuses described herein may also take active measures to correct for asymmetry. One of these active measures is shown in FIG. 2, which illustrates correction of asymmetry by way of reversing direction of current flow in a heater or similar slider-mounted electrical component.

Figure 2:
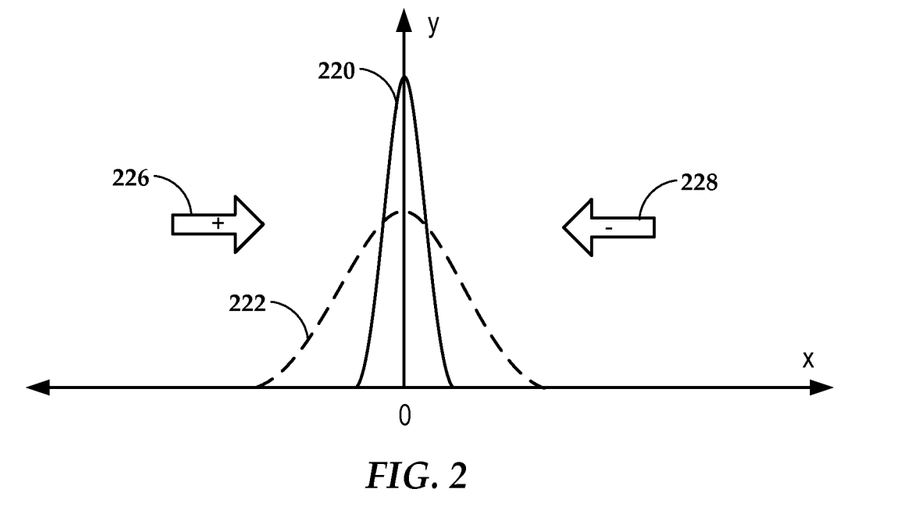
FIG. 2 is a graph illustrating correction of asymmetry according to an example embodiment.

The graph of FIG. 2 may represent distributions of any signal characteristics (e.g., amplitudes) that characterize symmetry of the signal about a reference point (e.g., zero volts). Generally, the y-axis of FIG. 2 represents a population of measurements, and the x-axis represents asymmetry of the measurements. Thus, where x=0 the measurements are symmetric. Where x<0 and x>0, the measurements are negatively and positively asymmetric, respectively.

Signals obtained from read transducers that read an encoded pattern of continuously alternating positive and negative flux directions may exhibit a distribution of signal outputs such as 220 if the transducer outputs are significantly symmetrical. Distribution 222, on the other hand, may represent analogous signal outputs that exhibit significant positive and/or negative asymmetry. By recognizing that current supplied to a heater or similar device may influence these signals 222, a direction of the current flow may be selected that decreases the asymmetry. This selection of a current direction is indicated by arrows 226 and 228, which result in respective positive and negative corrective magnetic fields. Transducers that exhibit positive asymmetry may have a negative field 228 applied, and transducers with negative asymmetry may have a positive field 226 applied.

Current-drawing devices such as heaters may not require a particular polarity of current in order to operate. In such a case, switching of current direction as shown in FIG. 2 may be done without making any changes to the device. Other devices (e.g., lasers) may require a certain polarity of supplied power, in which case adaptations to the device and/or circuits supplying power to the device may need to be made in order to implement switching of current direction as shown.

Figure 3A:
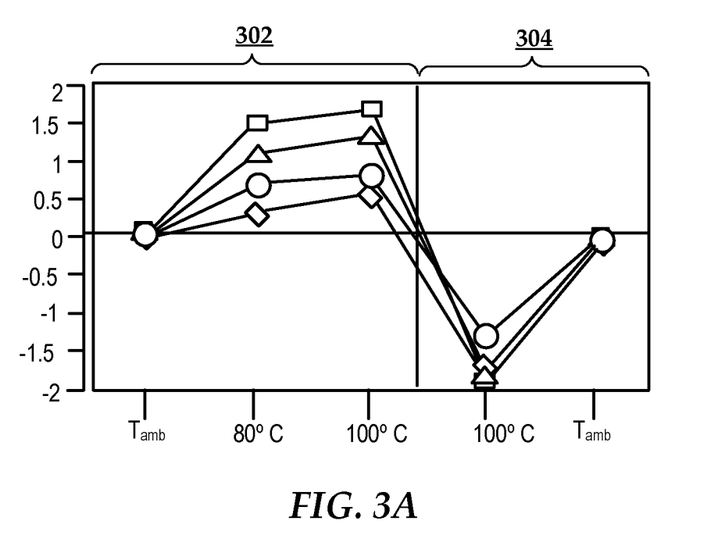
FIG. 3A is a graph illustrating effects of heater current direction on read transducer resistance according to an example embodiment.

In FIG. 3A, a graph illustrates the effect of changing heater current flow direction on resistance of a reader head due to magnetic fields created by the heater. Each of the data sets (those data points in FIG. 3A that are represented by a common symbol) represents an influence on reader resistance at different head temperatures for a different heater designs. The data points in a first portion 302 of the graph represent changes to reader head resistance in a first direction of current flow, and the data points in a second portion 304 of the graph represent resistance change for an opposite direction of current flow.

As FIG. 3A suggests, a direction reversal of current being supplied to a slider-integrated heater can be chosen so as reduce asymmetry exhibited by a read transducer. In view of this, the direction of heater current flow may be adapted/modified to reduce head asymmetry during design, manufacture, and/or operation. The design of circuitry for selecting current flow direction in this way is known in the art (e.g., by selecting/reversing polarity of voltage applied to the heater), and therefore is not discussed in greater detail. The direction of current flow may be selected statically (e.g., set once) or dynamically (e.g., via a control circuit) at any time, including design phase, manufacturing, and/or while in use.

As FIG. 3A also suggests, the amount of asymmetry correction may be dependent on the amount of current flowing through the heater, which may be dependent on a desired temperature of the slider. A described above, slider temperature may be set based on a desired distance between the read transducer and the media, and without regards to asymmetry of the read signal. As a result, the amount of current flowing at a particular time may not be enough to fully correct read transducer asymmetry. Even so, a small amount of asymmetry correction is better than none, and therefore selection of current direction through the heater may be a straightforward way to provide such correction. In other cases the read signal may currently sufficiently symmetric, in which case there may be no need for asymmetry correction via heater-induced magnetic fields. In such a case, systems and apparatuses may also include features to statically and/or dynamically change the magnitudes of the magnetic fields induced by these currents, as well as the direction.

Figure 3B:
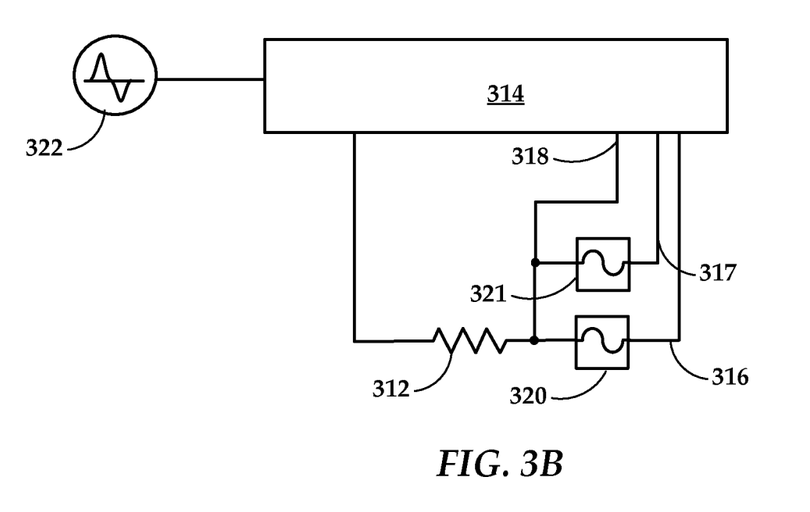
FIG. 3B is a circuit diagram illustrating selection of alternate current paths to affect read transducer asymmetry according to an example embodiment.

In reference now to FIG. 3B, a circuit diagram illustrates an example of how current flowing through a heating element 312 may be adapted to positively affect read transducer output signal symmetry. Current may flow through a slider heating element 312 in either a reverse or forward direction, e.g., in response to a voltage applied from a controller 314 as described above. In addition, a number of conductive paths 316-318 may be available to supply the current to the heater element 312, wherein any combination of the paths 316-318 may be active/available at a give time. While the number and arrangement of active paths 316-318 may not result in significant changes to the performance of the heating element 312, the choice of paths 316-318 may have a measureable difference in the magnetic fields generated by the current flowing through the paths 316-318, in particular the magnetic fields that influence symmetry of the signal output from a read transducer.

In order to vary the amount of magnetic fields induced by current flowing through the heater 312, the paths 316-318 may have a number of different characteristics. For example, some of the paths 316-318 may be routed closer to a read transducer than others of the paths 316-318. In such a case, sending current through different combinations of the paths can change an amount of magnetic flux created by activation of the heater 312. Other differences between the paths 316-318 may include differences in path length, convolution, magnetic shielding, cross sectional area, or any other characteristic that may influence an amount of magnetic flux caused by activation of the heater 312.

The paths 316-318 may be dynamically selected by the controller 314, e.g., in response to an amount of current presently being sent to the heater and/or amount of asymmetry of a read transducer output signal 322. In another arrangement, the paths may be selected during manufacture. In the latter case, the circuit may include features such as fuses 320-321, which may cause an open circuit along any of respective paths 316, 317 in response to, e.g., application of energy such as an over-current or radio frequency radiation. Certain paths (e.g., path 318) may not include any such fuse, e.g., to ensure at least one current path remains in place in case of accidental application of energy (e.g., static electricity) or other event that might open the fuses 320, 321.

Figure 4A:
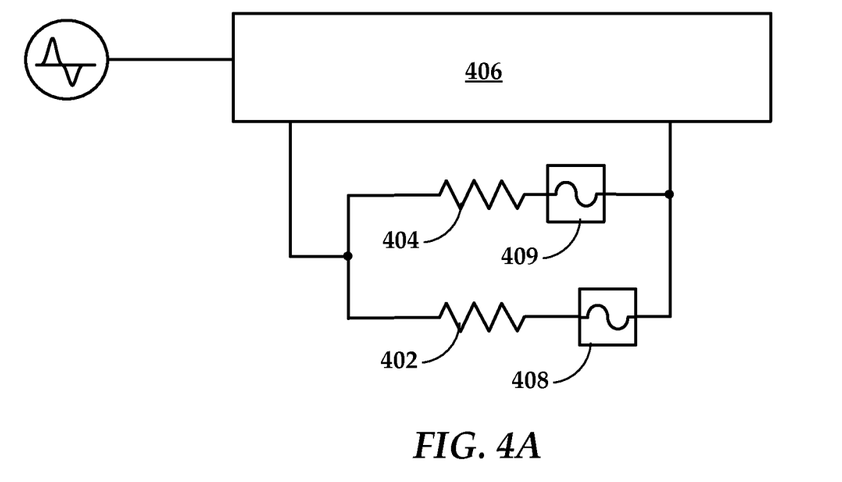
FIGS. 4A-4B are circuit diagrams illustrating selection from multiple heaters configurations to affect read transducer asymmetry according to an example embodiment.
Figure 4B:
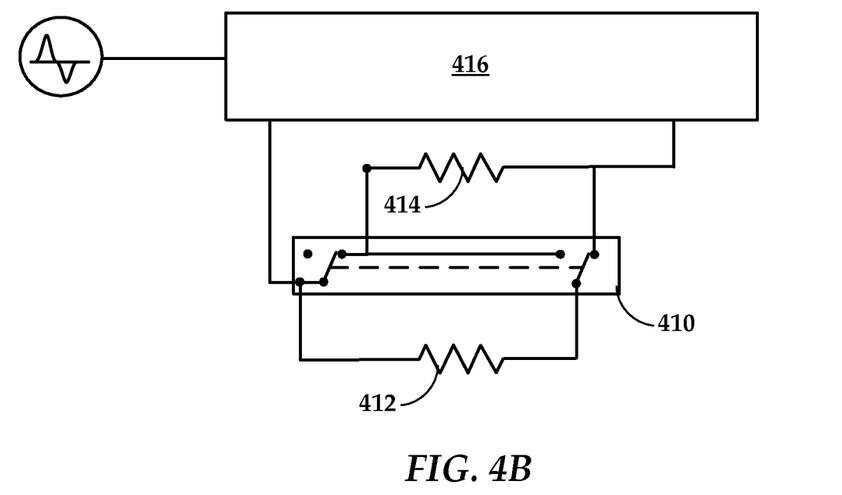

Other variations on heater design may enable changing an amount of magnetic flux induced from a heater current. Examples of these designs are shown in FIGS. 4A-4B. In FIG. 4A, parallel heaters 402, 404 may be selectably activated, either dynamically by way of controller 406, or statically by way of fuse elements 408, 409. This may affect current flowing through parallel heater branches and/or common conductor paths, and side effects may have to be considered in heater control design (e.g., affects on response times). In FIG. 4B, multiple heaters 412 and 414 are also used. In this case, a switch element 410 selects whether multiple heaters 412, 414 are activated in parallel or in series. The switch 410 may be a one-time activated component similar to fuse, or may be implemented in controller 416, which may dynamically change wiring of the heater 412, 414 based on current conditions.

The circuits shown in FIGS. 3B, 4A and 4B are provided for purposes of illustration and not of limitation. These examples can be readily adapted to change the number of heating elements and paths from those illustrated, and to combine features therebetween. For example, any of these circuits can be enabled to reverse a direction of heater current in order to positively influence asymmetries of a read transducer signal. These concepts may also be applied to other current carrying components located proximate to a read head, e.g., lasers, write heads, heat-assisted magnetic recording (HAMR) components, etc.

Figure 5:
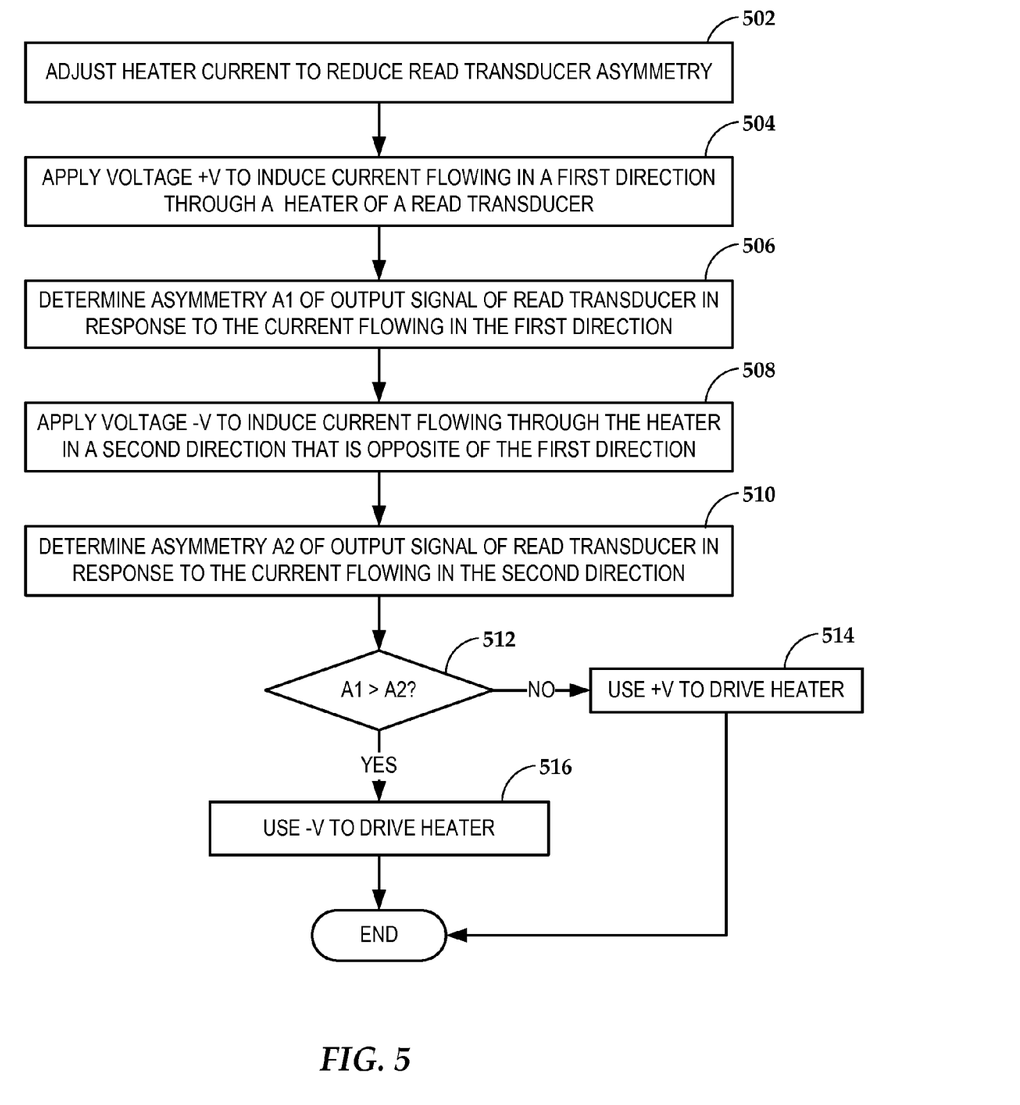
FIGS. 5 and 6 are flowcharts illustrating procedures for adjusting heater current to reduce read transducer asymmetry according to example embodiments.

In reference now to FIG. 5, a flowchart illustrates a procedure 502 for adjusting heater current to reduce read head transducer asymmetry according to an example embodiment. In this example, a voltage +V is applied 504 to induce a first direction of current flow through a heater of a read transducer. An asymmetry A1 of an output signal of the read transducer is determined 506 in response to the current flowing in the first direction. A reverse voltage −V is applied 508 to the heater, and a second asymmetry A2 is determined 510 based on the reverse current flow. If it is determined 512 that A1>A2 (e.g., more asymmetry due to +V) then −V is used 516 to drive the heater, otherwise +V is used 514.

It will be appreciated that the procedure 502 may be modified in a number of ways discussed above. For example, instead of or in addition to applying reverse voltages 504, 508, different current paths and/or heater circuits may be selected for purposes of reducing asymmetry. Further, the order of events may be reversed, and all events need not be performed on all magnetic reader/writer devices. For example, actions 504, 506, 508, 510, 512 may be performed on test/prototype units, and actions 514, 516 applied to individual devices depending on the respective results. In another alternative embodiment, a test may be made to determine if A1=A2. In such a case, the transducer may be sufficiently symmetric, and no correction is needed. This may be useful in cases where magnetic biasing due to heater currents can be minimized, e.g., by selection of alternate conduction paths.

Figure 6:
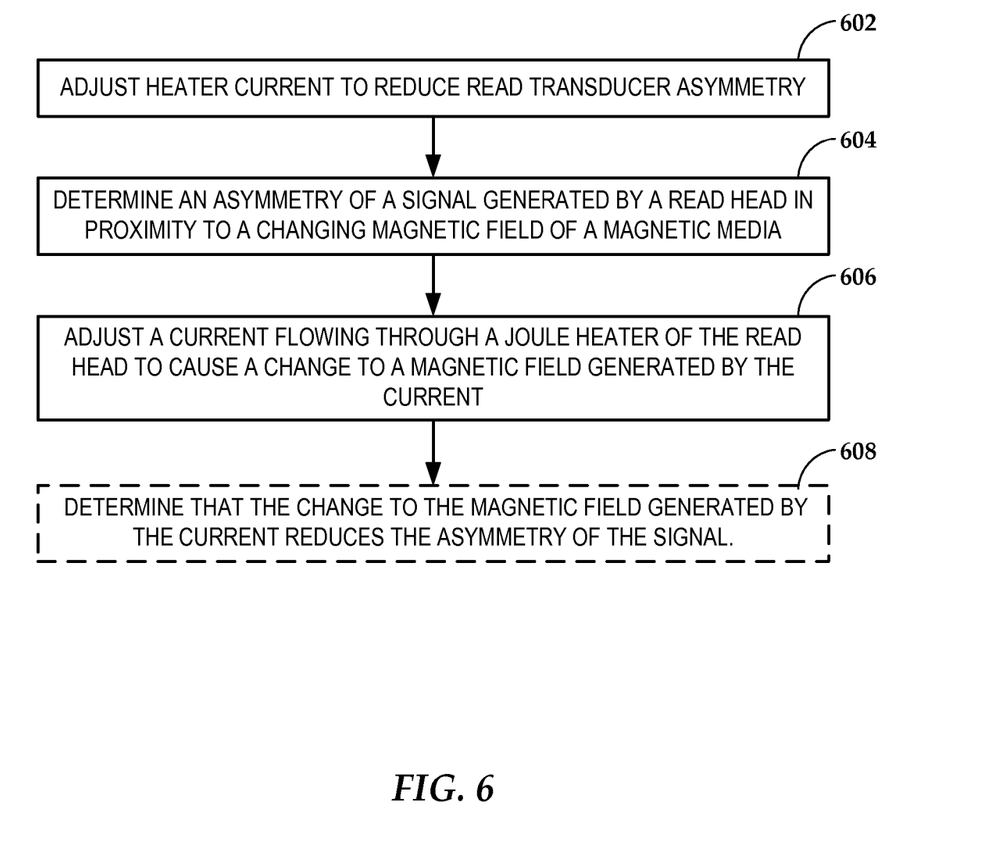

In reference now to FIG. 6, a flowchart illustrates another procedure 602 according to an example embodiment. An asymmetry is determined 604 of a signal generated by a read head in proximity to a changing magnetic field of a magnetic media. In response to determining the asymmetry of the signal, a current flowing through a joule heater of the read head is adjusted 606 to cause a change to a magnetic field generated by the current. The change to the magnetic field generated by the current is intended to reduce the asymmetry of the signal, and this effect may optionally be determined 608 as part of the procedure.

The foregoing description of the example embodiments has been presented for the purposes of illustration and description. It is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising: determining asymmetry of a signal generated by a read transducer;
    adjusting a current flowing through a heater associated with the read transducer to produce a magnetic field that reduces the asymmetry of the signal generated by the read transducer after determining the asymmetry.

2. The method of claim 1, wherein adjusting the current flow comprises changing a direction of the current flow.

3. The method of claim 1, further comprising determining the asymmetry via a transfer curve test.

4. The method of claim 3, wherein the transfer curve test involves placing the read transducer in a variable magnetic field during manufacture of a device that comprises the read transducer.

5. The method of claim 1, further comprising determining the asymmetry of the signal based on an output of the read transducer during operation of a data storage apparatus that comprises the read transducer.

6. The method of claim 1, wherein the heater is used to adjust a distance between the read transducer and a magnetic media.

7. The method of claim 1, wherein the read transducer produces the signal in response to being proximate to a changing magnetic field of a magnetic media.

8. The method of claim 1, wherein the heater comprises a joule heater.

9. The method of claim 1, wherein adjusting the current flow comprises blowing one or more fuses of two or more conductive paths that couple the heater and a power source that provides the current.

10. An apparatus comprising:
    a read transducer that generates a signal in response to reading a magnetic media; and
    a heater coupled to a power source that adjusts a current flowing through the heater to produce a magnetic field that reduces an asymmetry of the signal of the read transducer after determining the asymmetry of the signal.

11. The apparatus of claim 10, wherein the power source adjusts the current flow by changing a direction of the current flow.

12. The apparatus of claim 10, wherein the asymmetry is determined via a transfer curve test.

13. The apparatus of claim 10, further comprising a controller configured to determine the asymmetry of the signal based on an output of the read transducer during operation of the apparatus and adjust the current flowing through the heater via the power source in response thereto.

14. The apparatus of claim 10, further comprising two or more conductive paths coupled between the heater and the power source, and wherein one or more of the conductive paths comprises a fuse, and wherein the current flow is adjusted by blowing at least one of the fuses.

15. The apparatus of claim 10, wherein the heater comprises a joule heater.

16. A system comprising:
   a read transducer that generates a signal in response to being in proximity to a magnetic media;
   a heater; and
   a controller coupled to the heater, the controller including circuitry configured to determine asymmetry of the signal based on an output of the read transducer during operation of the system and that adjusts a current flowing through the heater to alter a magnetic field that encompasses at least the read transducer, wherein the altered magnetic field reduces the asymmetry of the signal generated by the read transducer.

17. The system of claim 16, wherein the controller adjusts the current flow by changing a direction of the current flow.

18. The system of claim 16, wherein the heater comprises a joule heater that is used to adjust a distance between the head and the magnetic media.

19. The system of claim 16, further comprising two or more conductive paths coupled between the heater and the controller, wherein one or more of the conductive paths comprises a fuse, and wherein the current flow is adjusted by blowing at least one of the fuses.

* * * * *